(12) United States Patent
Bellar et al.

(10) Patent No.: US 11,396,428 B2
(45) Date of Patent: Jul. 26, 2022

(54) FLEXIBLE AUTOMATED SORTING AND TRANSPORT ARRANGEMENT

(71) Applicant: Walmart Apollo, LLC, Bentonville, AR (US)

(72) Inventors: Jason Bellar, Bella Vista, AR (US); Donald Ray High, Anderson, MO (US); Jeremy L. Velten, Bella Vista, AR (US); Robert Cantrell, Herndon, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 217 days.

(21) Appl. No.: 16/592,828

(22) Filed: Oct. 4, 2019

(65) Prior Publication Data

US 2020/0122927 A1    Apr. 23, 2020

Related U.S. Application Data

(60) Provisional application No. 62/749,110, filed on Oct. 22, 2018.

(51) Int. Cl.
*B65G 1/137* (2006.01)
(52) U.S. Cl.
CPC .................... *B65G 1/1375* (2013.01)
(58) Field of Classification Search
CPC combination set(s) only.
See application file for complete search history.

(56) References Cited

U.S. PATENT DOCUMENTS

| 7,261,511 | B2 | 8/2007 | Felder et al. |
| 8,882,432 | B2 | 11/2014 | Bastian, II et al. |
| 9,120,622 | B1 | 9/2015 | Elazary et al. |
| 9,914,627 | B2 | 3/2018 | Shugen |

(Continued)

FOREIGN PATENT DOCUMENTS

CN    106347948 A    1/2017

OTHER PUBLICATIONS

Okagv, Eddie, 105. Lurking type AGV: carrying automatic shelf AGV demo, YouTube video https://www.youtube.com/watch?v=l1G3G8-Lful, published Mar. 3, 2017.

(Continued)

*Primary Examiner* — Kyle O Logan

(57) ABSTRACT

A disclosed system for transporting items to destination locations, for example when receiving inventory at large retail locations, includes a conveyor assembly comprising a plurality of docking locations; an item identifier operable to read identification data; an orchestrator operable to, based at least on the identification data, pair items with transporter solutions; and a sorting controller operable to, based at least on the identification data and the pairings, route items to specific docking locations where transporter solutions are docked. Transporter solutions may include autonomous ground vehicles (AGVs) that bid on delivery tasks and can adjust shelf height in order to facilitate loading and unloading. The AGVs can thus provide an effectively seamless conveyor solution—either rollers on the conveyor surface move items or rollers on the underside of the AGV move the AGV with the items.

18 Claims, 5 Drawing Sheets

(56) References Cited

U.S. PATENT DOCUMENTS

| | | | |
|---|---|---|---|
| 2008/0092488 A1* | 4/2008 | Gabrielsen | B65B 55/20 |
| | | | 53/428 |
| 2017/0262796 A1* | 9/2017 | Wahlmeier | G06Q 10/087 |
| 2018/0127211 A1 | 5/2018 | Jarvis et al. | |
| 2019/0135551 A1* | 5/2019 | Sekich | B65G 47/34 |

OTHER PUBLICATIONS

Unknown, "WEWO Europe AGV System Assembly line", WEWO Europe, YouTube video, published 2016.

* cited by examiner

FLEXIBLE AUTOMATED SORTING AND TRANSPORT ARRANGEMENT

BACKGROUND

In large retail settings, the delivery, unloading, and sorting of items can be a significant aspect of operational efficiency. Convoluted, wasteful, and labor-intensive operations can degrade efficiency and negatively impact profitability. In some conventional approaches, this delivery, unloading, and sorting process has been a largely manual process, involving employees unloading items from a delivery vehicle, placing the items on carts, and then pushing or pulling the carts around the retail floor space to the proper shelf location.

Such a labor-intensive process introduces the potential of delays and wasted efforts when, for example, an employee is mistaken about the correct shelf location (which can occur when the employee is new or the shelf location has recently changed), or the cart is loaded with multiple items that are each destined for disparate shelf locations. Additionally, the manner in which a cart is loaded can affect the efficiency of unloading the items when the cart is at a destination location for one of the items on the cart.

Some retail facilities may use a mechanized routing arrangement, involving a conveyor track, either powered or gravity-driven, to move items from a delivery vehicle to an in-store cart. However, space available for the routing arrangement may be limited, as many retail store designs seek to maximize the amount of retail floor space for a given facility size. Thus, the operational and physical flexibility, as well as the footprint, of a mechanized routing arrangement may affect usability and further impact a retail entity's operational efficiency.

SUMMARY

In some examples, a system for transporting items to destination locations comprises: a conveyor assembly comprising a plurality of docking locations; an item identifier operable to read identification data of a first item and identification data of a second item; an orchestrator operable to, based at least on the identification data of the first item, pair the first item with a first transporter and, based at least on the identification data of the second item, pair the second item with a second transporter different than the first transporter; and a sorting controller operable to, based at least on the identification data and the pairings, route the first item to a first docking location of the plurality of docking locations and route the second item to a second docking location of the plurality of docking locations.

BRIEF DESCRIPTION OF THE DRAWINGS

The disclosed examples are described in detail below with reference to the accompanying drawing figures listed below.

Figure 1:
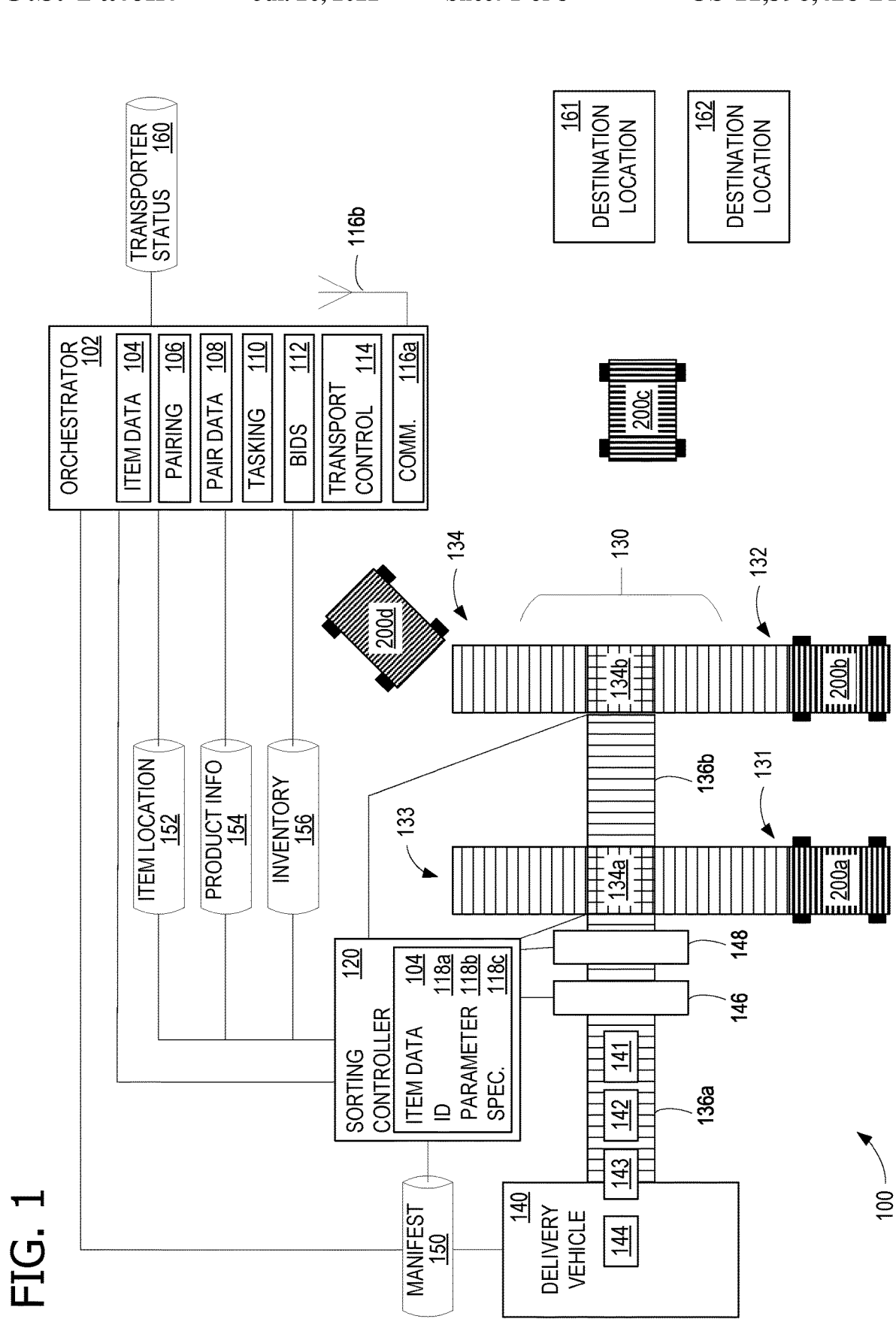
FIG. 1 illustrates an exemplary flexible automated sorting and transport arrangement.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

Currently, many receiving processes in retail environments (e.g., unloading and sorting) are manual and labor intensive. Prior to the arrival of a delivery vehicle, employees may arrange a sorting area by positioning carts and pallets at specific destination locations. For example, some pallets may be intended to hold products that are destined for aisle displays and/or promotions. When a delivery vehicle arrives at the retail facility, items may be unloaded onto a relatively fixed and stationary conveyor extending linearly and may be manually pushed downstream along the conveyor surface. In some of these processes, employees may read item identification labels to identify the items as specific inventory products and then make a decision as to the appropriate destination location. Such a manual process is subject to error when the employees are not sufficiently trained or attentive, and is labor-intensive.

A disclosed system for transporting items to destination locations, for example when receiving inventory at large retail locations, includes a conveyor assembly comprising a plurality of docking locations; an item identifier operable to read identification data; an orchestrator operable to, based at least on the identification data, pair items with transporter solutions; and a sorting controller operable to, based at least on the identification data and the pairings, route items to specific docking locations where transporter solutions are docked. Transporter solutions may include autonomous ground vehicles (AGVs) that bid on delivery tasks and can adjust shelf height in order to facilitate loading and unloading. The AGVs can thus provide an effectively seamless conveyor solution—either rollers on the conveyor surface move items or rollers on the underside of the AGV move the AGV with the items—with at least some degree of autonomy.

An automated sorting and transport arrangement described herein leverages on-board intelligence to make decisions and uses a plurality of data sources, including inventory and transportation information. A centralized orchestrator may direct a fleet of autonomous assets, using artificial intelligence (AI) to track assets and make optimal decisions for tasking the fleet of autonomous assets to perform item delivery operations with efficient resource usage. For example, the delivery time of may be minimized, or the most efficient energy usage may be realized, within some given constraints.

An AGV topped by a conveyor or roller system becomes an otherwise indistinguishable addition to a belt or roller system link while it is attached. When one or more items are loaded, the AGV can detach from the primary conveyor assembly and drive itself to the start of another, for example, a conveyance into a kiosk or direct to a shelf. The AGV effectively closes the physical gap between the two, and the item can roll onto the AGV and then off the AGV as if there was a single, uninterrupted conveyance line. This mirrors, in principle, how a ferry is the end of a roadway on one side of a river and becomes the beginning of a roadway once the ferry reaches the other. Thus, in some examples, no special system is required to load or unload the AGV because the AGV top or hold is effectively a part of the conveyance system with which it is used.

AGVs may wait at a distance from the primary conveyor assembly and when an item is paired with the AGV, the AGV will be instructed to dock and receive the item. Upon reception of the item, the AGV may wait in place to receive another item, deliver the item, or detach from the primary conveyor assembly and wait in a holding area until it is instructed to either return to the primary conveyor assembly to receive another item or deliver the item at a delayed time. Specific shelves may be used, based on item height, weight (for example heavier, shorter items on lower shelves), or the nearest corresponding shelf height at the delivery destination location. Shelves may be repositionable, such as aligning the shelf of an AGV with the height of the rollers of the docking location, when receiving an item, and the height of the destination shelf or kiosk intake when delivering an item.

FIG. 1 illustrates an exemplary flexible automated sorting and transport arrangement 100. The illustrated example of arrangement 100 includes an orchestrator 102, a sorting controller 120, and a conveyor assembly 130 comprising a plurality of docking locations 131, 132, 133, and 134. Conveyor assembly 130 also includes a first conveyor track 136a, a second conveyor track 136b, and sorting portions 134a and 134b. In some examples, conveyor tracks 136a and 136b are gravity conveyors with unpowered rollers in which items roll along due to a gentle downward slope, or pushed along by a human. In some examples, conveyor tracks 136a and 136b include powered rollers and/or a powered belt. In some examples, sorting portions 134a and 134b use sorting arms or directional rollers, in order to route items in a particular direction. Although two sections of conveyor track, two sorting portions, and four docking locations are illustrated, it should be understood that a different number of these elements may be used in alternative examples. In some examples, arrangement 100 may be constructed of aluminum, using PVC rollers, in order to reduce weight, and may have modular construction in order to facilitate rapid assembly and disassembly, and compact storage.

Rollers on first conveyor track 136a and second conveyor track 136b may collectively define the conveying surface of conveyor assembly 130. In this form, items 141-144 (and others) may be unloaded from a delivery vehicle 140 at a delivery location (such as at the loading dock of a shopping facility) and may be deposited on first conveyor track 136a, which serves as a staging area for items passing through an item identifier 146 and a measurement module 148. Item identifier 146 is operable to read identification data of first item 141, identification data of second item 142, identification data of third item 143, and identification data of any other items being offloaded from delivery vehicle 140, such as fourth item 144. As configured in the example, item identifier 146 is operable to read identification data when an item is disposed on conveyor assembly 130 (specifically, on first conveyor track 136a) and passes beneath or through item identifier 146. In some examples, item identifier 146 includes a barcode scanner to read a barcode on items 141, 142, 143, 144, and any other items unloaded from delivery vehicle 140.

The illustrated example further includes a measurement module 148 operable to measure a parameter of items 141, 142, 143, 144, and any other items unloaded from delivery vehicle 140. Some examples of measurement module 148 include a weight measurement module, an optical dimensional measurement module, or both. Thus, the measured parameters include weight, dimension, shape, and/or color, in various examples. This permits determination of damage to any of items 141, 142, 143, 144, when one or more of measured weight, dimensions, shape, color, or some other parameter does not match expected values. In some examples, sorting portions 134a and 134b are bi-directional and include a first set of rollers configured to propel an item in the forward direction and a second set of rollers to divert an item in a second direction (sideways). In some examples, the second set of rollers elevate when an item is to be diverted. If the item is to proceed in the forward direction, the second set of rollers is not elevated. In this manner, sorting portions 134a and 134b can sort items in multiple directions (e.g., left or right).

Four transporters 200a-200d are shown. In some examples, transporters 200a-200d are AGVs, described in further detail with respect to FIGS. 2A and 2B. As illustrated, first transporter 200a is docked at first docking location 131; second transporter 200b is docked at second docking location 132; third transporter 200c is maneuvering between docking location 133 and some destination location; and fourth transporter 200d is shown as being in the process of docking at fourth docking location 134.

A sorting controller 120 is in communication with sorting portions 134a and 134b, item identifier 146, and measurement module 148. Sorting controller 120 is operable to, based at least on item identification data 118a (read from item 141 by item identifier 146 and stored within item data 104) and pairing data 108 (provided by orchestrator 102), route first item 141 to first docking location 131, and route second item 142 to second docking location 132. To accomplish this, in some examples, sorting controller 120 accesses multiple data sets 150-156. For example, sorting controller 120 accesses cargo manifest 150 which is optionally provided as an electronic data set stored in an electrical device accompanying delivery vehicle 140 or stored elsewhere and associated with delivery vehicle 140.

Additionally, sorting controller 120 accesses item location information 152, product information 154, and inventory data 156. In an exemplary operation, when delivery vehicle 140 arrives, orchestrator 102 and sorting controller 120 receive cargo manifest 150, to identify the items on delivery vehicle 140 that require sorting and distribution to locations within a facility, for example first and second destination locations 161 and 162. As items 141-144 are unloaded from delivery vehicle 140, item identification data 118a is read from items 141-144 (and other items) by item identifier 146 and stored within item data 104 within or accessible to sorting controller 120. Sorting controller 120 uses product information 154 to locate item specification data 118c. Item specification data 118c includes stored parameter values of the various items 141-144, such as weight, dimensions, shape, and color. Item parameter measurements 118b, measured by measurement module 148 as items 141-144 pass though (or nearby, within range of sensors) are sent to sorting controller 120. Measured and stored parameter values are compared, in some examples, to ascertain whether any items are damaged. If so, then based at least on a comparison between a parameter measurement and a stored parameter value, an item is routed to a disposal location rather than a docking location where a transporter is waiting to deliver the item to a display shelf location (or other customer pick-up location, such a kiosk or automated storage and retrieval system (ASRS)).

However, in the absence of detected damage, when routed to first docking location 131, first item 141 will be loaded onto transporter 200a for delivery to a first destination location 161. When routed to second docking location 132, second item 142 will be loaded onto transporter 200b for delivery to a second destination location 162. In this manner, items 141 and 142 may be delivered to destination locations 161 and 162, respectively. In the event that damage had been detected for first item 141, sorting controller 120 is operable to, based at least on a comparison between the parameter measurement and a stored parameter value, route the first item to a third location (e.g., docking location 133) instead of docking location 131.

An orchestrator 102 is in communication with sorting controller 120, and also accesses some or all of data sets 150-156. In some configurations, orchestrator 102 is one or more processing units or computing nodes, such as computing node 400 of FIG. 4, local to arrangement 100. In some configurations, orchestrator 102 is provided as a cloud-based service. Orchestrator 102 is operable to, based at least on item identification data 118a of first item 141, pair first item 141 with first transporter 200a and, based at least on item identification data 118a of second item 142, pair second item 142 with second transporter 200b (which is a different transporter than first transporter 200a). To accomplish this, and other tasks, orchestrator 102 includes a copy of item data 104, a tasking module 110, a pairing module 106, pairing data 108, a transport control 114, and a communication module 116a that communicates with transporters 200a-200d wirelessly via wireless interface 116b. Wireless interface 116b may include any combination of near field communication (NFC), Bluetooth®, WiFi, or another wireless protocol.

In operation, when orchestrator 102 is alerted to the presence of first item 141 on conveyor assembly 130, for example by receiving item identification data 118a for item 141, orchestrator 102 will attempt to pair item 141 with one or transporters 200a-200d using pairing module 106. Orchestrator 102 can use item location information 152 to ascertain where item 141 should be delivered, and transporter status 160 to ascertain which transporter assets are available for use. If orchestrator 102 determines that one of transporters 200a-200d is suitable for delivering item 141, such as, for example, transporter 200a is already tasked with delivering other items to the same or nearby destination location, orchestrator 102 will pair item 141 with transporter 200a and generate pairing data 108 pairing item 141 with transporter 200a. Orchestrator 102 retains the current status of the transporters with which it has been paired (registered), including the location of each transporter. Therefore, at least one of orchestrator 102 and sorting controller 120 is able to ascertain that transporter 200a is docked at docking location 131. Thus, sorting controller 120 will, based at least on item identification data 118a for item 141 and the pairing data 108 of item 141 with transporter 200a, route item 141 to docking location 131 where it will be loaded onto transporter 200a.

Similarly, when orchestrator 102 is alerted to the presence of second item 142 on conveyor assembly 130, for example by receiving item identification data 118a for item 142, orchestrator 102 will attempt to pair item 142 with one of transporters 200a-200d. Orchestrator 102 can use item location information 152 to ascertain where item 142 should be delivered. If orchestrator 102 determines that one of transporters 200a-200d is suitable for delivering item 142, such as, for example, transporter 200b is already tasked with delivering other items to the same or nearby destination location, orchestrator 102 will pair item 142 with transporter 200b. At least one of orchestrator 102 and sorting controller 120 is able to ascertain that transporter 200b is docked at docking location 132. Thus, sorting controller 120 will, based at least on item identification data 118a for item 142 and the pairing data 108 of item 142 with transporter 200b, route item 142 to docking location 132 where it will be loaded onto transporter 200b. In addition to pairing an item with a transported, some examples of orchestrator 102 select a shelf of a transporter to receive an item. This can be based, for example, on the shelf height at the destination location (item destination information). Orchestrator 102 then instructs the transporter (e.g., one of transporters 200a-200d) to align the selected shelf with the roller surface at the docking location. In some examples, orchestrator 102 may inform a transporter of the item size, weight, and destination shelf height, and permit the transporter to decide which shelf to use, based on the transporter's existing or expected loading.

However, if orchestrator 102 determines that none of the transporters currently docked at conveyor assembly 130 is a good choice for delivering an item, orchestrator 102 will transmit (using communication module 116a) a delivery task for the item to the plurality of transporters to which orchestrator 102 has been paired (registered) and which are available for performing delivery tasks (e.g., transporters 200a-200d). Transporters 200a-200d will each then respond with bids for the delivery task, which are received by orchestrator 102. In some examples, the bids include the delivery time and estimated marginal power used (e.g., battery power) in accomplishing the task. Orchestrator stores the received bids 112 received in communications from the plurality of transporters, such as transporters 200a-200d, and associates each bid with a transporter ID that had been determined when the particular transporter was paired with orchestrator 102. Based at least on the communications from a plurality of transporters, orchestrator 102 performs a cost minimization operation to pair the item with a transporter. The cost minimization will be a system-wide minimization, including the plurality of transporters 200a-200d.

For example, item 143 may be going to a destination nearby item 141. If transporter 200a has sufficient capacity to also carry item 143, then the marginal power that transporter 200a estimates that it will use to deliver item 143 will be fairly low. Additionally, since transporter 200a is already docked, the delivery time will be relatively quick. In contrast, in this example, transporter 200b has been tasked to deliver item 142 at a destination location a considerable distance away, and so the marginal power that transporter 200b estimates that it will use to deliver item 143 will be fairly high. Additionally, neither of transporters 200c and 200d is in position yet, so they will each require a longer time than transporter 200a. Therefore, orchestrator 102 pairs item 143 with transporter 200a, and sorting controller 120 will route item 143 to docking location 131 for loading onto transporter 200a.

As an additional example, item 144 may be going to a destination nearby item 142, but transporter 200b does not have sufficient capacity to also carry item 144. Orchestrator 102 transmits the delivery tasks and pairs item 144 with transporter 200d. Orchestrator 102 instructs transporter 200d to dock at docking location 134 and further to align the height of a shelf of transporter 200d with the height of docking location 134 to receive item 144. This process follows what had occurred earlier when orchestrator 102 had instructed first transporter 200a to dock at first docking location 131 and instructed second transporter 200b to dock at second docking location 132. Orchestrator 102 had also instructed first transporter 20a to align a first shelf of first transporter 200a with first docking location 131 to receive first item 141. Upon transporter 200a and transporter 200b reporting full (or some other condition) orchestrator 102 instructs first transporter 200a to deliver first item 141 to first destination location 161 and instructs second transporter 200b to deliver second item 142 to second destination location 162.

Figure 2A:
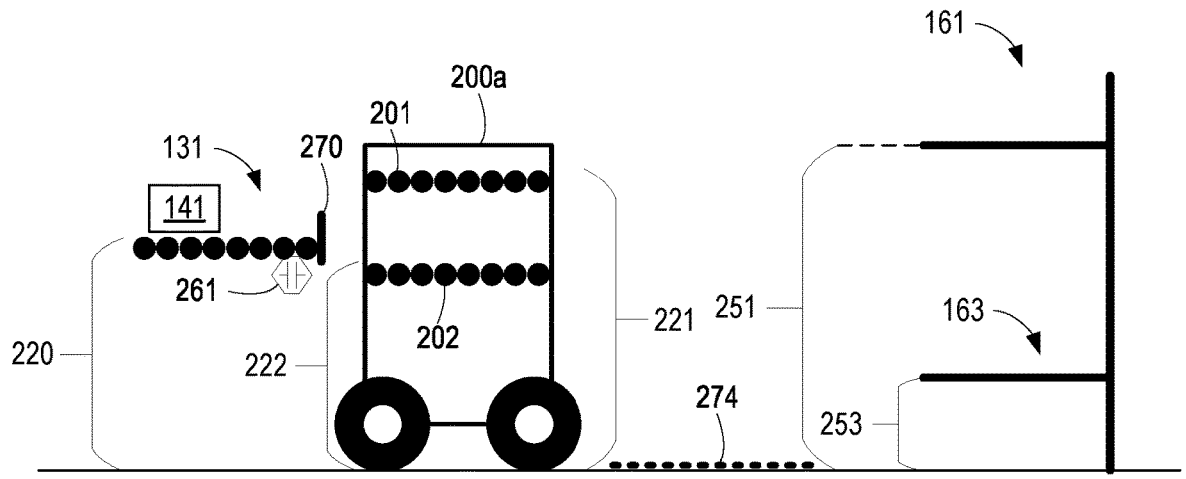
FIG. 2A shows an exemplary transporter unit and height measurements relevant to the arrangement of FIG. 1.
Figure 2B:
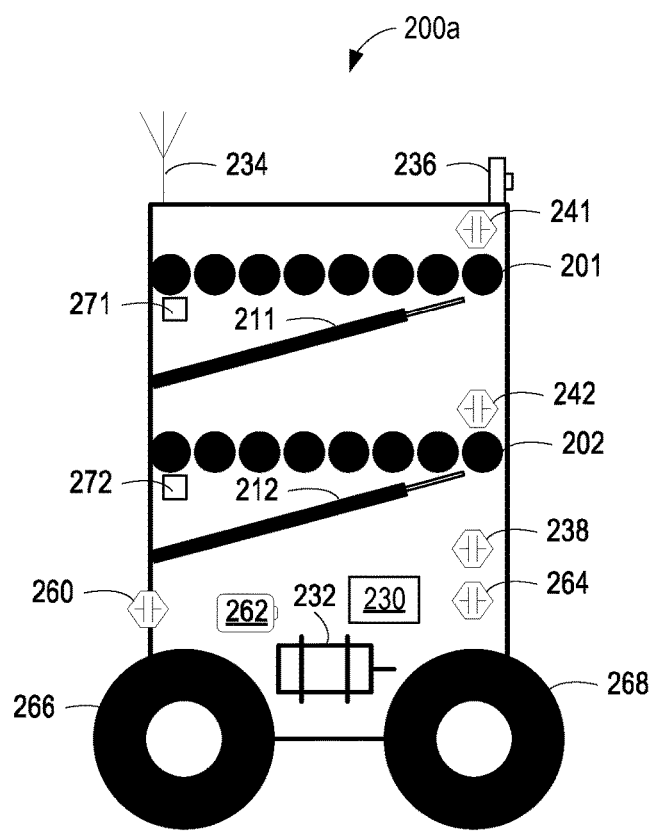
FIG. 2B shows an exemplary transporter unit in greater detail.

FIG. 2A shows an exemplary transporter 200a and height measurements relevant to the arrangement of FIG. 1, and FIG. 2B shows transporter 200a in greater detail. FIGS. 2A and 2B should be viewed together. Transporter 200a is an exemplary transporter unit; transporters 200b-200d may be similar or effectively identical. In some examples, transporter 200a is an AGV with at least one shelf 201, a shelf elevator 211 operable to raise and lower shelf 201, and a drive unit 232 operable to move AGV 200a (transporter 200a) between docking location 131 and first destination location 161. Transporter 200a also a navigation module 238, a wireless communication module 234, a monitoring module 264 operable to monitor a parameter status of AGV 200a, and a controller 230 in communication with shelf elevator 211, drive unit 232, navigation module 238, and communication module 234. As illustrated, AGV 200a additionally includes a second shelf 202 and a second shelf elevator 212, in communication with controller 230, and operable to raise and lower shelf 202. Some examples of shelf elevators 211 and 212 permit adjusting shelves for tilting the shelves front/back and left/right, to provide for a level surface if the conditions of the floor or conveyor assembly 130 warrant an adjustment.

When AGV 200a reaches docking location 131, docking sensor 260 on AGV 200a and docking sensor 261 at docking location 131 perform a handshaking operation and report to controller 230 and also orchestrator 102 and/or sorting controller 120 (both of FIG. 1) that AGV 200a is docked at docking location 131. Orchestrator 102 has determined that item 141 will be going to destination location 161, and another item, such as item 143 will be carried on AGV 200a to go to destination location 163. Since destination location 161 is a higher shelf than destination location 163, orchestrator has paired item 141 with shelf 201 of AGV 200a and item 143 with shelf 202. Since item 141 will arrive first, orchestrator 102 or sorting controller 120 instructs AGV 200a to position shelf 201, at height 221, to a first height that corresponds to aligning shelf 201 with a height 220 of docking location 131.

Controller 230 uses shelf elevator 211 to properly position shelf 201. As illustrated, shelf 201 comprises a conveyor portion that is implemented as a series of parallel rollers. At a later time, when AGV 200a is delivering item 141 to destination location 161, controller 230 will use shelf elevator 211 to position shelf 201 to a second height that corresponds to aligning shelf 201 with a height 251 of destination location 161. In some examples, height 251 is different from height 220. Returning to the loading process, when item 143 arrives, orchestrator 102 or sorting controller 120 instructs AGV 200a to position shelf 202, at height 222, to the height that corresponds to aligning shelf 202 with a height 220 of docking location 131. Similarly then, when AGV 200a is delivering item 143 to destination location 163, controller 230 will use shelf elevator 212 to position shelf 203 to a height that corresponds to aligning shelf 202 with a height 253 of destination location 163. When AGV 200a is docked and a shelf is properly positioned (e.g., at height 220), AGV 200a signals that it is ready to accept items, using docking sensor 260 and/or communication module 234.

Controller 230 communicates with orchestrator 102 and/or sorting controller 120 wirelessly using communication module 234, and may further communicate with orchestrator 102 and/or sorting controller 120 using docking sensors 260 and 261. In some examples, docking sensors 260 and 261 may additionally assist with final navigation in order to precisely align AGV 200a with docking location 131. Docking sensors 260 and 261 may include any combination of proximity sensors, navigation sensors, lidar, and contact sensors. Controller 230 communicates with orchestrator 102 and/or sorting controller 120 to transmit AGV parameter status information to orchestrator 102, which is monitored by monitoring module a monitoring module 264. In some examples, the parameter status information monitored by monitoring module 264 and transmitted to orchestrator 102 include load status, remaining load capacity, weight, remaining operational capacity, and position. An example of remaining operational capacity information is the charge remaining in battery 262 that powers drive unit 232 to maneuver AGV 200a between a docking location (such as docking location 131) and destination locations (such as destination locations 161 and 163). This information informs orchestrator 102 whether AGV has sufficient remaining power to complete its currently-assigned tasks, and take on additional tasks. Controller 230 communicates with orchestrator 102 to receive a delivery tasks, wirelessly transmit bids, and receive delivery instructions from orchestrator 102. Controller 230 includes logic for generating bids in response to receiving new tasks from orchestrator 102.

A collision avoidance module 236 is operable to sense pending collisions and instruct an avoidance maneuver. In some examples, collision avoidance module 236 includes an optical sensor; in some examples, collision avoidance module 236 includes an infrared or ultrasonic proximity sensor. In some examples, an optical sensor in collision avoidance module 236 can be monitored by a human or an AI process, in order to prevent collisions. Remote human monitoring may utilize communication module 234 for transmitting video and other status information regarding AGV 200a. In some examples, AI is implemented in controller 230, whereas in some examples, AI is implemented in a remote node that instructs controller 230. In some examples, machine learning (ML) may be used in navigation, collision avoidance, and pairing in order to minimize delivery times and maximize energy efficiency. AGV 200a may have a standard path of travel, according to a localization grid with floor navigation components 274, which may include magnetic strips, readable optical pathways, or other means to rapidly, reliably, and precisely determine location.

A conveyor gate 270 is kept raised until AGV 200a is in place and ready to accept items, so that items do not roll off docking location 131. Conveyor gate 270 acts as a barrier until it is lowered, in order to permit items to roll from docking location 131 onto AGV 200a. Similarly, roller brakes 271 and 272 on shelves 201 and 202, respectively, can prevent items on AGV 200a from rolling off shelves 201 and 202 while AGV 200a is in motion. Roller brakes 271 and 272 prevent the rollers on shelves 201 and 202 from turning. It should be understood that any combination of conveyor gates and roller brakes may be used on docking location 131 and AGV 200a. Sensors 241 and 242 monitor the positions and loads on shelves 201 and 202, respectively. For example, sensors may include mechanically-actuated contacts for position-sensing, optical sensors for shelf position and load sensing, and weight sensors.

In some examples, AGV 200a may recharge battery 262 at docking location 231. In some examples, transporter 200a may be an unmanned aerial vehicle (UAV), such as an autonomous UAV, rather than a ground vehicle or AGV. In some examples, a plurality of transporters may be used in tandem, such as an AGV ferrying items to a UAV. In some examples, transporter 200a may include human navigation and control options, such as push bars.

Figure 3A:
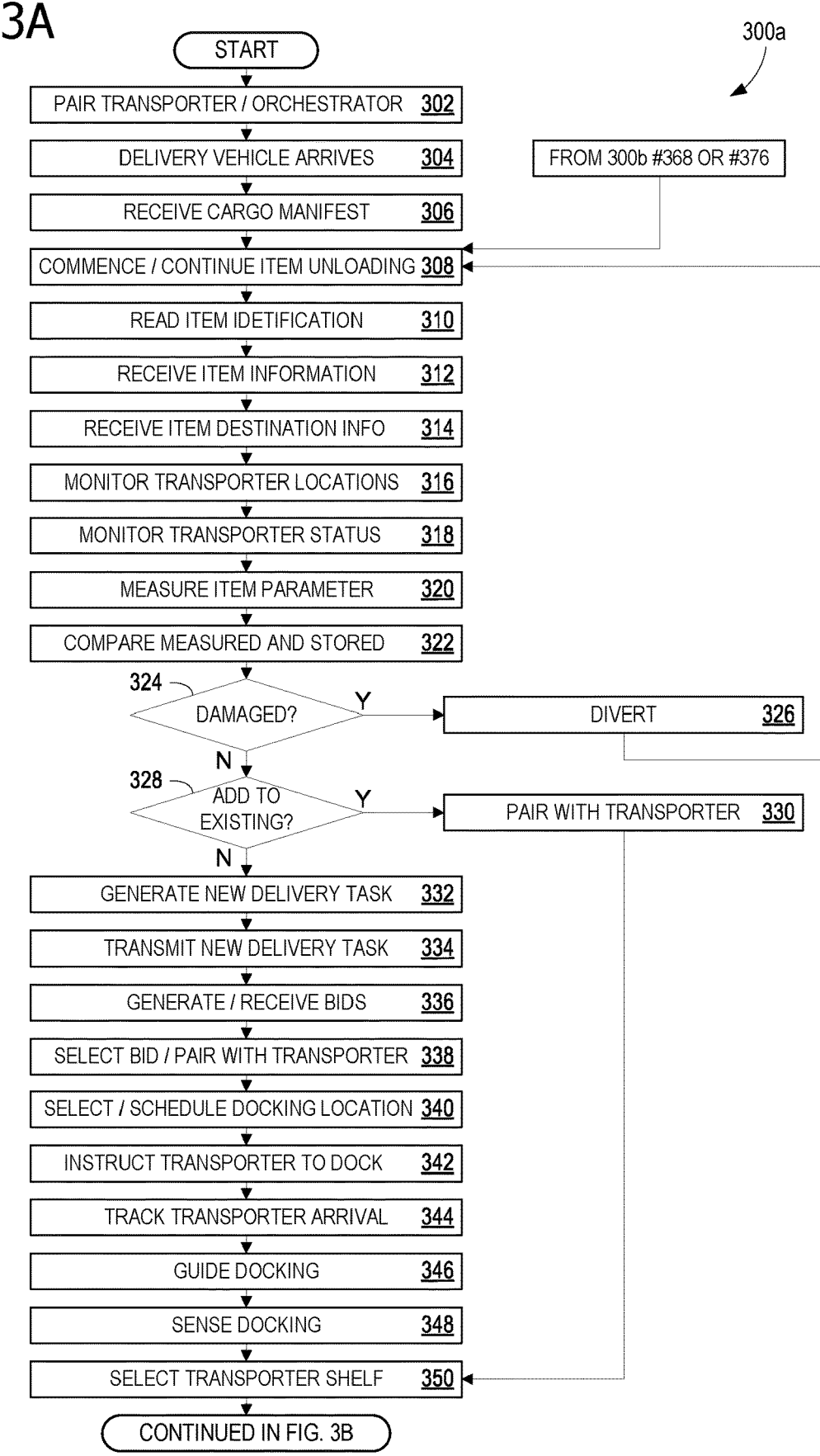
FIGS. 3A and 3B together comprise a flow chart of operations associated with the flexible automated sorting and transport arrangement of FIG. 1.
Figure 3B:
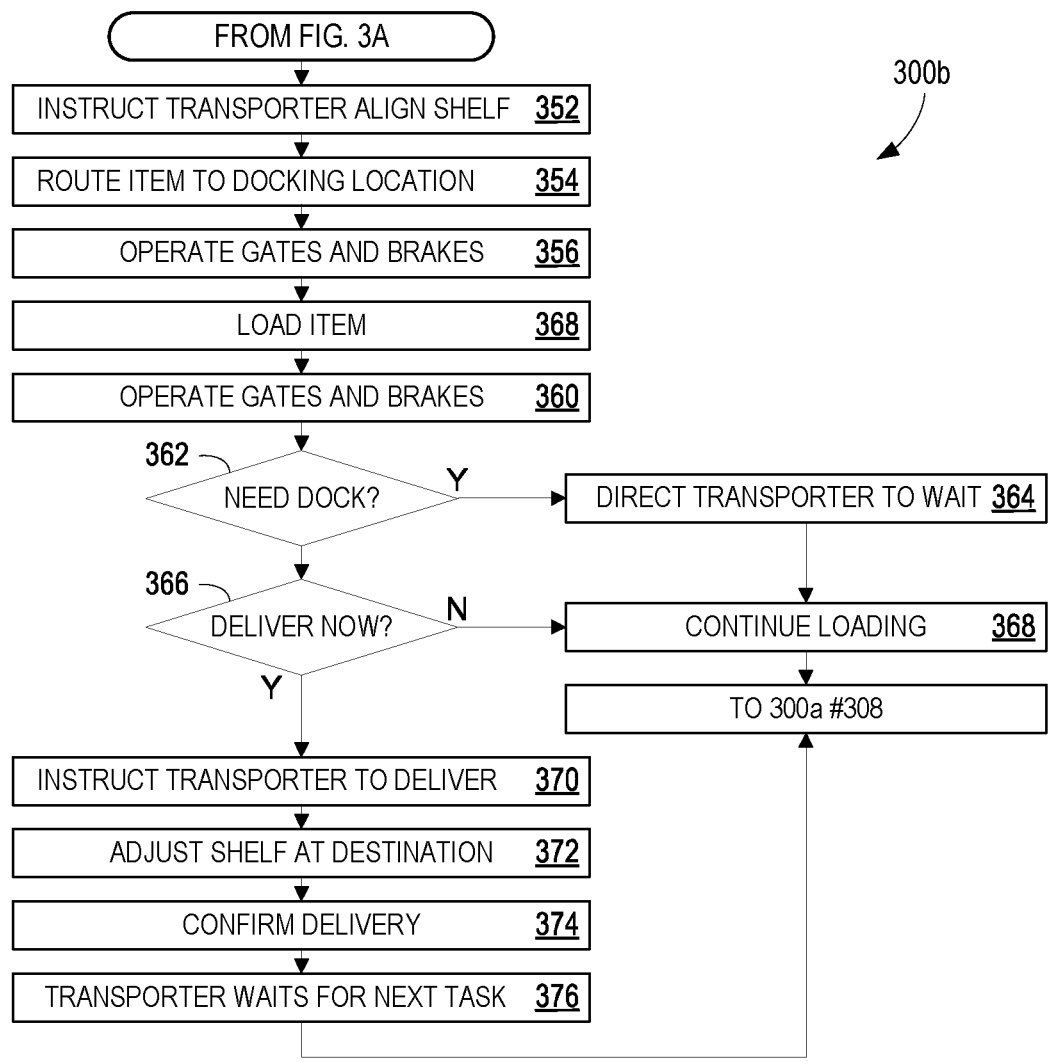

FIGS. 3A and 3B together comprise a flow chart of operations (300a and 300b) associated with the flexible automated sorting and transport arrangement of FIG. 1. Flow charts 300a and 300b should be viewed as a single chart. In operation 302, a transporter, such as transporter 200a (of FIGS. 1-2B), is paired (registered) with orchestrator 102 (of FIG. 1). This permits orchestrator 102 to use transporter 200a as a delivery asset and determine an ID number for transporter 200a. At 304, a delivery vehicle arrives and a cargo manifest is received by orchestrator 102 and sorting controller 120 (also of FIG. 1), for example, cargo manifest 150. Items are unloaded at 308 and operation 310 includes reading item identification, for example reading identification data of a first item and identification data of a second item. The item information, including stored parameter values is retrieved, and is received at 312. Item destination information is received at 314, so that orchestrator 102 possesses the destination location information.

Orchestrator 102 monitors transporter locations in operation 316, which includes receiving communications from a plurality of transporters. Orchestrator 102 also monitors transporter status in operation 318, which also includes receiving communications from a plurality of transporters. Received information includes, in some examples, indicators of remaining operational service life, such as errors, failures, and remaining battery life. This information is stored in transporter status 160 (of FIG. 1) to assist orchestrator 102 in ascertaining which transporters are available for tasking. Operation 320 includes measuring a parameter of the item, for example, measuring a weight parameter or a dimension parameter of the item. The stored parameter value(s) retrieved in operation 312 and the measured parameter(s) is compared in operation 322, to determine whether the item is damaged. If damage is detected in decision operation 324, based at least on a comparison between the parameter measurement and a stored parameter value, operation 326 diverts the item to the location for damaged goods. This is accomplished, for example, by routing the item to a location different than a docking location where it would have been picked up for delivery to a display location. The process then returns to operation 308 for the next item.

If, however, no damage is detected, then orchestrator 102 determines whether the current item may be added to an existing delivery task. This can be the case when a transporter has remaining capacity (to accommodate both the dimensions and the weight of the item), and is already tasked to go to a nearby destination location. In some examples, AI may be used for the item/transport pairings. If, in decision operation 328, orchestrator 102 determines that the item may be added to an existing task, orchestrator 102 pairs the item with the selected transporter. For example, if two items are traveling along conveyor assembly 130 (of FIG. 1), and orchestrator 102 determines that each one may be paired with a different transporter that is already docked, the operation 330 includes, based at least on the identification data of the first item, pairing the first item with a first transporter, and based at least on the identification data of the second item, pairing the second item with a second transporter different than the first transporter. The process then moves to operation 350, which will be described below.

If, however, in decision operation 328, controller determines that a new delivery task is needed for the item, then at 332, orchestrator 102 generates a new delivery task. Operation 334 includes transmitting the delivery task for the item to the plurality of transporters. The transporters generate bids and transmit them to orchestrator 102, and orchestrator 102 receives the bids in operation 336. That is, orchestrator 102 receives communications from the plurality of transporters, including a first transporter and a second transporter, and receiving communications from the plurality of transporters comprises receiving bids from the plurality of transporters for the delivery task. In operation 338, orchestrator 102 selects a bid and pairs the item with a transporter. For example, operation 338 includes, based at least on the communications received from the plurality of transporters, pairing a first item with a first transporter and, at a later time, operation 338 includes pairing a second item with a second transporter. In some examples, pairing an item with a transporter comprises performing a cost minimization operation. Various parameters may be optimized, such as delivery time, energy usage, or a weighted combination.

At 340, orchestrator 102 then selects a docking location to receive the selected transporter. If the docking location is currently full, orchestrator 102 may select the currently-docked transporter to temporarily depart and wait in a holding area. (See operation 364, below.) When the docking location becomes available, orchestrator 102 instructs the transporter to dock at the docking location at 342. If orchestrator 102 is instructing two transporters, then operation 342 includes instructing the first transporter to dock at the first docking location and instructing the second transporter to dock at the second docking location. Transporter arrival is tracked at 344, and docking precision navigational guidance is provided in operation 346. Docking is sensed at 348, for example by docking sensors 260 and 261 (of FIGS. 2A and 2B, respectively) performing a handshaking operation.

Some examples include selecting a transporter shelf according to the destination shelf height, such as items destined for lower display shelves will be loaded onto lower transporter shelves and items destined for higher display shelves will be loaded onto upper transporter shelves. Shelf selection is accomplished in operation 350, which includes, based at least on item destination information for the item, selecting a shelf of the transporter to receive the first item. Operation 352 includes instructing the transporter to align the selected shelf with the docking location. In some examples, however, if there is only a single shelf, or the destination information is not used, operation 350 is skipped and operation 352 includes instructing the transporter to align a shelf of the transporter with the docking location to receive the item. Items are routed to the proper docking location, at 354. For example, if orchestrator 102 processes delivery operations multiple items, operation 354 includes, based at least on the identification data and the pairing, routing the first item to a first docking location of a plurality of docking locations. At a later time, operation 354 includes, based at least on the identification data and the pairing, routing the second item to a second docking location of the plurality of docking locations.

Conveyor gates and roller brakes are operated at 356, in order to permit the item to roll onto the transporter. The item rolls onto the transporter at 358, thereby loading the transporter. Conveyor gates and roller brakes are operated again at 360, in order to prevent unwanted movement of any items. After the item is loaded, the transporter may be instructed to depart and wait in a holding area. For example, in decision operation 362, orchestrator 102 determines whether the docking location is needed. (See operation 340 above.) If the docking location is needed, the transporter is instructed to depart and wait in operation 364, for a delayed continuation in loading. The transporter may wait nearby, so it can rapidly dock again to receive more items. In decision operation 366, orchestrator 102 determines that transporter should deliver loaded items. If not, then the transporter awaits continued loading at 368, and returns to operation 308.

A transporter may be instructed to deliver items if it is at or near capacity (e.g. at maximum weight, or so shelf space remains), or in some cases, even if it is only partially filled. In operation 370, orchestrator 102 instructs the transporter to deliver the items. For example, if two transporters are ready to depart for delivery, operation 370 includes instructing the first transporter to deliver the first item to a first destination location and then (possibly at a later iteration) instructing the second transporter to deliver the second item to a second destination location. When a transporter arrives at a destination location, it adjusts the shelf height for unloading at 372, such as matching the height of the transporter's shelf with the display shelf. The transporter then confirms delivery at 374 and awaits the next task from orchestrator 102.

Exemplary Operating Environment

Figure 4:
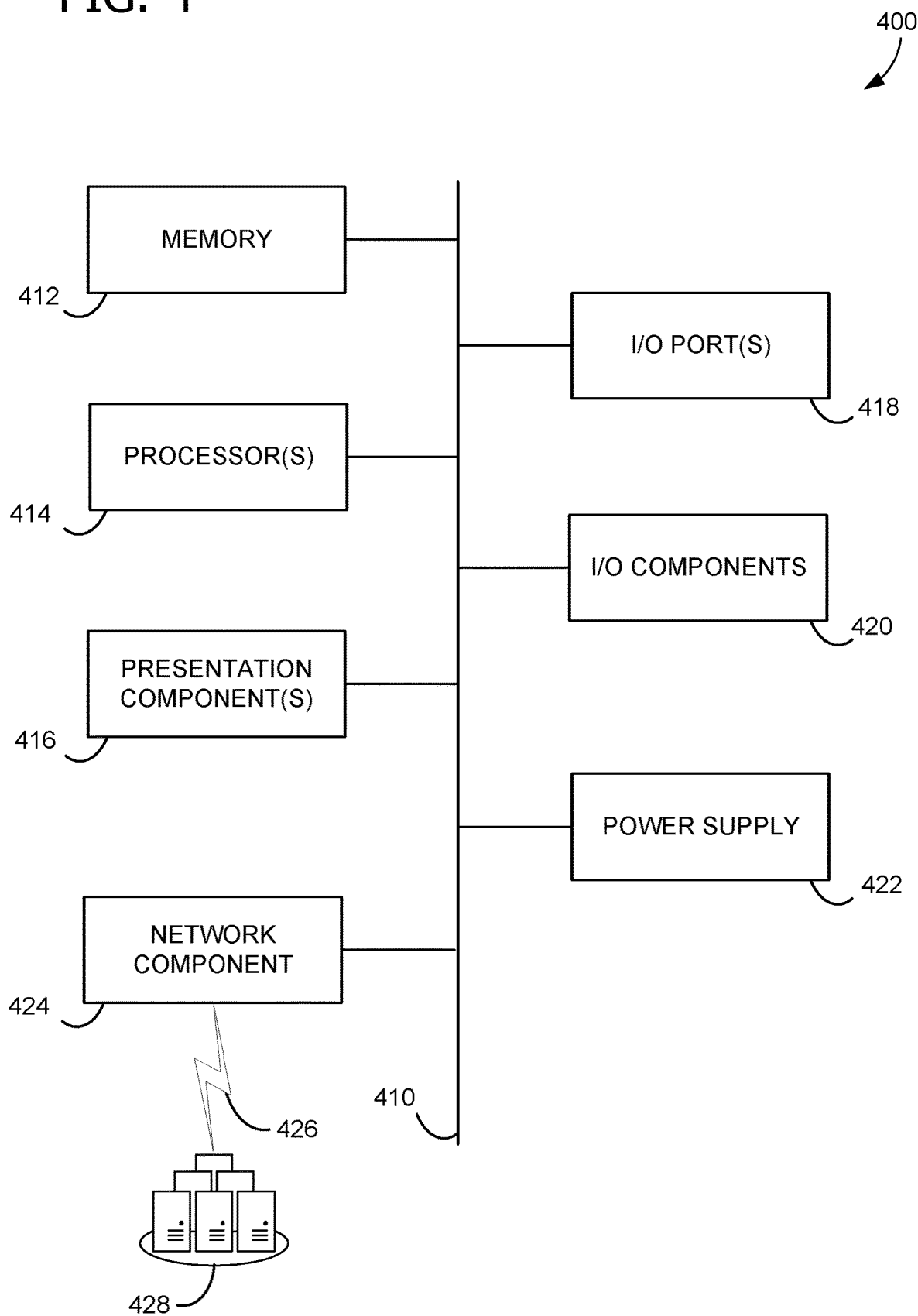
FIG. 4 is a block diagram of an example computing node for implementing aspects disclosed herein.

FIG. 4 is a block diagram of an example computing node 400 for implementing aspects disclosed herein and is designated generally as computing node 400. Computing node 400 is one example of a suitable computing environment and is not intended to suggest any limitation as to the scope of use or functionality of the invention. Neither should the computing node 400 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through a communications network.

Computing node 400 includes a bus 410 that directly or indirectly couples the following devices: memory 412, one or more processors 414, one or more presentation components 416, input/output (I/O) ports 418, I/O components 420, a power supply 422, and a network component 424. Computing node 400 should not be interpreted as having any dependency or requirement related to any single component or combination of components illustrated therein. While computing node 400 is depicted as a seemingly single device, multiple computing nodes 400 may work together and share the depicted device resources. That is, one or more computer storage devices having computer-executable instructions stored thereon may perform operations disclosed herein. For example, memory 412 may be distributed across multiple devices, processor(s) 414 may provide housed on different devices, and so on.

Bus 410 represents what may be one or more busses (such as an address bus, data bus, or a combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 4 is merely illustrative of an exemplary computing node that can be used in connection with one or more embodiments. Distinction is not made between such categories as "workstation," "server," "laptop," "hand-held device," etc., as all are contemplated within the scope of FIG. 4 and the references herein to a "computing node" or a "computing device." Memory 412 may include any of the computer-readable media discussed herein. Memory 412 may be used to store and access instructions configured to carry out the various operations disclosed herein. In some examples, memory 412 includes computer storage media in the form of volatile and/or nonvolatile memory, removable or non-removable memory, data disks in virtual environments, or a combination thereof.

Processor(s) 414 may include any quantity of processing units that read data from various entities, such as memory 412 or I/O components 420. Specifically, processor(s) 414 are programmed to execute computer-executable instructions for implementing aspects of the disclosure. The instructions may be performed by the processor, by multiple processors within the computing node 400, or by a processor external to the client computing node 400. In some examples, the processor(s) 414 are programmed to execute instructions such as those illustrated in the flowcharts discussed below and depicted in the accompanying drawings. Moreover, in some examples, the processor(s) 414 represent an implementation of analog techniques to perform the operations described herein. For example, the operations may be performed by an analog client computing node 400 and/or a digital client computing node 400.

Presentation component(s) 416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 400, across a wired connection, or in other ways. Ports 418 allow computing node 400 to be logically coupled to other devices including I/O components 420, some of which may be built in. Example I/O components 420 include, for example but without limitation, a microphone, keyboard, mouse, joystick, game pad, satellite dish, scanner, printer, wireless device, etc.

In some examples, the network component 424 includes a network interface card and/or computer-executable instructions (e.g., a driver) for operating the network interface card. Communication between the computing node 400 and other devices may occur using any protocol or mechanism over any wired or wireless connection. In some examples, the network component 424 is operable to communicate data over public, private, or hybrid (public and private) using a transfer protocol, between devices wirelessly using short range communication technologies (e.g., near-field communication (NFC), Bluetooth® branded communications, or the like), or a combination thereof. Network component 424 communicates over communication link 426 to a cloud resource 428. Various different examples of communication link 426 include a wired connection, wireless connection, and/or a dedicated link, and in some examples, at least a portion is routed through the internet. Various different examples of cloud resource 428 include data storage for the data sets 150-156 of FIG. 1, and computational services for some or all of the functionality of orchestrator 102 of FIG. 1.

Although described in connection with an example computing node 400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for transporting items to destination locations comprises: a conveyor assembly comprising a plurality of docking locations; an item identifier operable to read identification data of a first item and identification data of a second item; an orchestrator operable to, based at least on the identification data of the first item, pair the first item with a first transporter and, based at least on the identification data of the second item, pair the second item with a second transporter different than the first transporter; and a sorting controller operable to, based at least on the identification data and the pairings, route the first item to a first docking location of the plurality of docking locations and route the second item to a second docking location of the plurality of docking locations.

An exemplary method of transporting items to destination locations comprises: reading identification data of a first item and identification data of a second item; based at least on the identification data of the first item, pairing the first item with a first transporter; based at least on the identification data of the second item, pairing the second item with a second transporter different than the first transporter; and based at least on the identification data and the pairings, routing the first item to a first docking location of a plurality of docking locations and routing the second item to a second docking location of the plurality of docking locations.

One or more computer storage devices having computer-executable instructions stored thereon for orchestrating transport of items to destination locations, which, on execution by a computer, cause the computer to perform operations comprising: reading identification data of a first item and identification data of a second item; transmitting a delivery task for the first item to a plurality of AGVs; receiving communications from the plurality of AGVs, including a first AGV and a second AGV, wherein the receiving communications from the plurality of AGVs comprises receiving bids from the plurality of AGVs for the delivery task; based at least on the communications received from the plurality of AGVs, pairing the first item with the first AGV and pairing the second item with the second AGV, wherein pairing the first item with the first AGV comprises performing a cost minimization operation; instructing the first AGV to dock at a first docking location of a plurality of docking locations; instructing the second AGV to dock at a second docking location of the plurality of docking locations; based at least on item destination information for the first item, selecting a shelf of the first transporter to receive the first item; instructing the first transporter to align the selected shelf with the first docking location; based at least on the identification data and the pairings, routing the first item to the first docking location and routing the second item to the second docking location; and instructing the first AGV to deliver the first item to a first destination location and instructing the second AGV to deliver the second item to a second destination location.

Alternatively, or in addition to the other examples described herein, examples include any combination of the following:

the item identifier is operable to read identification data when an item is disposed on the conveyor assembly;

the first transporter the second transporter each comprises an AGV;

a measurement module operable to measure a parameter of the first item;

the measurement module comprises a weight measurement module or an optical dimensional measurement module;

measuring a weight parameter or a dimension parameter of the first item;

the sorting controller is further operable to, based at least on a comparison between the parameter measurement and a stored parameter value, route the first item to a third location different than the first docking location;

based at least on a comparison between the parameter measurement and a stored parameter value, routing the first item to a third location different than the first docking location;

the orchestrator is further operable to instruct the first transporter to align a first shelf of the first transporter with the first docking location to receive the first item;

instructing the first transporter to align a first shelf of the first transporter with the first docking location to receive the first item;

the orchestrator is further operable to, based at least on item destination information for the first item, select a shelf of the first transporter to receive the first item, and instruct the first transporter to align the selected shelf with the first docking location;

based at least on item destination information for the first item, selecting a shelf of the first transporter to receive the first item;

instructing the first transporter to align the selected shelf with the first docking location;

the orchestrator is further operable to instruct the first transporter to dock at the first docking location and instruct the second transporter to dock at the second docking location.

instructing the first transporter to dock at the first docking location;

instructing the second transporter to dock at the second docking location;

the orchestrator is further operable to receive communications from a plurality of transporters, including the first transporter and the second transporter, based at least on the communications from a plurality of transporters, pair the first item with the first transporter and pair the second item with the second transporter, and instruct the first transporter to deliver the first item to a first destination location and instruct the second transporter to deliver the second item to a second destination location;

receiving communications from a plurality of transporters, including the first transporter and the second transporter;

based at least on the communications received from the plurality of transporters, pairing the first item with the first transporter and pairing the second item with the second transporter;

instructing the first transporter to deliver the first item to a first destination location and instructing the second transporter to deliver the second item to a second destination location;

the orchestrator is further operable to transmit a delivery task for the first item to the plurality of transporters, wherein the receiving communications from the plurality of transporters comprises receiving bids from the plurality of transporters for the delivery task, and wherein pairing the first item with the first transporter comprises performing a cost minimization operation;

transmitting a delivery task for the first item to the plurality of transporters;

receiving communications from the plurality of transporters comprises receiving bids from the plurality of transporters for the delivery task; and pairing the first item with the first transporter comprises performing a cost minimization operation.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for transporting items to destination locations, the system comprising:
    a conveyor assembly comprising a plurality of docking locations;

an item identifier operable to read identification data of a first item and identification data of a second item;

an orchestrator operable to, based at least on the identification data of the first item, pair the first item with a first transporter and, based at least on the identification data of the second item, pair the second item with a second transporter different than the first transporter; and a sorting controller operable to, based at least on the identification data and the pairings, route the first item to a first docking location of the plurality of docking locations and route the second item to a second docking location of the plurality of docking locations, wherein the orchestrator is further operable to instruct the first transporter to align a selected shelf of the first transporter with the first docking location to receive the first item based at least on item destination information for the first item.

2. The system of claim 1 wherein the item identifier is operable to read identification data when an item is disposed on the conveyor assembly.

3. The system of claim 1 wherein the first transporter and the second transporter each comprises an autonomous ground vehicle (AGV).

4. The system of claim 1 further comprising:
a measurement module operable to measure a parameter of the first item; and
wherein the sorting controller is further operable to, based at least on a comparison between the parameter measurement and a stored parameter value, route the first item to a third location different than the first docking location.

5. The system of claim 4 wherein the measurement module comprises a weight measurement module or an optical dimensional measurement module.

6. The system of claim 1 wherein the orchestrator is further operable to instruct the first transporter, upon reception of the first item by the first transporter, to at least one of (i) wait in place at the first docking location to receive a next item, (ii) depart from the first docking location to deliver the first item, or (iii) detach from the first docking location and wait in a holding area until further instructions are received.

7. The system of claim 1 wherein the orchestrator is further operable to instruct the first transporter to dock at the first docking location and instruct the second transporter to dock at the second docking location.

8. The system of claim 1 wherein the orchestrator is further operable to:
receive communications from a plurality of transporters, including the first transporter and the second transporter,
based at least on the communications from the plurality of transporters, pair the first item with the first transporter and pair the second item with the second transporter; and
instruct the first transporter to deliver the first item to a first destination location and instruct the second transporter to deliver the second item to a second destination location.

9. The system of claim 8 wherein the orchestrator is further operable to:
transmit a delivery task for the first item to the plurality of transporters,
wherein receiving communications from the plurality of transporters comprises receiving bids from the plurality of transporters for the delivery task, and
wherein pairing the first item with the first transporter comprises performing a cost minimization operation.

10. A method of transporting items to destination locations, the method comprising:
reading identification data of a first item and identification data of a second item;
based at least on the identification data of the first item, pairing the first item with a first transporter;
based at least on the identification data of the second item, pairing the second item with a second transporter different than the first transporter;
based at least on the identification data and the pairings, routing the first item to a first docking location of a plurality of docking locations and routing the second item to a second docking location of the plurality of docking locations; and
instructing the first transporter to align a first shelf of the first transporter with the first docking location to receive the first item, wherein the first transporter and the second transporter each comprises an autonomous ground vehicle (AGV).

11. The method of claim 10 further comprising:
upon reception of the first item by the first transporter, instructing the first transporter to at least one of (i) wait in place at the first docking location to receive a next item, (ii) depart from the first docking location to deliver the first item, or (iii) detach from the first docking location and wait in a holding area until further instructions are received.

12. The method of claim 10 further comprising:
measuring a weight parameter or a dimension parameter of the first item; and
based at least on a comparison between the parameter measurement and a stored parameter value, routing the first item to a third location different than the first docking location.

13. The method of claim 10 further comprising:
based at least on item destination information for the first item, selecting a shelf of the first transporter as the first shelf to receive the first item; and
instructing the first transporter to align the selected first shelf with the first docking location.

14. The method of claim 10 further comprising:
instructing the first transporter to dock at the first docking location; and
instructing the second transporter to dock at the second docking location.

15. The method of claim 10 further comprising:
receiving communications from a plurality of transporters, including the first transporter and the second transporter;
based at least on the communications received from the plurality of transporters, pairing the first item with the first transporter and pairing the second item with the second transporter; and
instructing the first transporter to deliver the first item to a first destination location and instructing the second transporter to deliver the second item to a second destination location.

16. The method of claim 15 further comprising:
transmitting a delivery task for the first item to the plurality of transporters;
wherein receiving communications from the plurality of transporters comprises receiving bids from the plurality of transporters for the delivery task; and
wherein pairing the first item with the first transporter comprises performing a cost minimization operation.

17. One or more computer storage devices having computer-executable instructions stored thereon for orchestrating transport of items to destination locations, which, on execution by a computer, cause the computer to perform operations comprising:

reading identification data of a first item and identification data of a second item;

transmitting a delivery task for the first item to a plurality of autonomous ground vehicle (AGVs);

receiving communications from the plurality of AGVs, including a first AGV and a second AGV, wherein receiving communications from the plurality of AGVs comprises receiving bids from the plurality of AGVs for the delivery task;

based at least on the communications received from the plurality of AGVs, pairing the first item with the first AGV and pairing the second item with the second AGV, wherein pairing the first item with the first AGV comprises performing a cost minimization operation;

instructing the first AGV to dock at a first docking location of a plurality of docking locations;

instructing the second AGV to dock at a second docking location of the plurality of docking locations;

based at least on item destination information for the first item, selecting a shelf of the first AGV to receive the first item;

instructing the first AGV to align the selected shelf with the first docking location;

based at least on the identification data and the pairings, routing the first item to the first docking location and routing the second item to the second docking location; and instructing the first AGV to deliver the first item to a first destination location and instructing the second AGV to deliver the second item to a second destination location.

18. The one or more computer storage devices of claim 17 wherein the operations further comprise:

measuring a weight parameter or a dimension parameter of the first item; and based at least on a comparison between the parameter measurement and a stored parameter value, routing the first item to a third location different than the first docking location.

* * * * *